(12) United States Patent
Yen et al.

(10) Patent No.: US 10,877,895 B2
(45) Date of Patent: Dec. 29, 2020

(54) METHOD, APPARATUS, AND SYSTEM FOR PREFETCHING EXCLUSIVE CACHE COHERENCE STATE FOR STORE INSTRUCTIONS

(71) Applicant: QUALCOMM Incorporated, San Diego, CA (US)

(72) Inventors: Luke Yen, Redmond, WA (US); Niket Choudhary, Bangalore (IN); Pritha Ghoshal, Raleigh, NC (US); Thomas Philip Speier, Wake Forest, NC (US); Brian Michael Stempel, Raleigh, NC (US); William James McAvoy, Raleigh, NC (US); Patrick Eibl, Durham, NC (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/113,120

(22) Filed: Aug. 27, 2018

(65) Prior Publication Data
US 2020/0065006 A1 Feb. 27, 2020

(51) Int. Cl.
*G06F 12/0871* (2016.01)
*G06F 3/06* (2006.01)
*G06F 12/0862* (2016.01)
*G06F 12/0815* (2016.01)

(52) U.S. Cl.
CPC ........ *G06F 12/0871* (2013.01); *G06F 3/0611* (2013.01); *G06F 3/0631* (2013.01); *G06F 3/0656* (2013.01); *G06F 3/0673* (2013.01); *G06F 12/0815* (2013.01); *G06F 12/0862* (2013.01); *G06F 2212/1024* (2013.01); *G06F 2212/604* (2013.01)

(58) Field of Classification Search
None
See application file for complete search history.

(56) References Cited

U.S. PATENT DOCUMENTS

| 6,374,332 | B1 | 4/2002 | MacKenthun et al. |
| 7,124,252 | B1* | 10/2006 | Khare ................. G06F 12/0831 711/137 |
| 2009/0204763 | A1 | 8/2009 | Shum et al. |
| 2015/0149730 | A1* | 5/2015 | Hu ........................ G06F 3/0613 711/136 |
| 2015/0261564 | A1 | 9/2015 | Busaba et al. |

OTHER PUBLICATIONS

International Search Report and Written Opinion—PCT/US2019/048209—ISA/EPO—dated Dec. 18, 2019.

* cited by examiner

*Primary Examiner* — Charles J Choi
(74) *Attorney, Agent, or Firm* — Edward J. Meisarosh

(57) ABSTRACT

A method, apparatus, and system for prefetching exclusive cache coherence state for store instructions is disclosed. An apparatus may comprise a cache and a gather buffer coupled to the cache. The gather buffer may be configured to store a plurality of cache lines, each cache line of the plurality of cache lines associated with a store instruction. The gather buffer may be further configured to determine whether a first cache line associated with a first store instruction should be allocated in the cache. If the first cache line associated with the first store instruction is to be allocated in the cache, the gather buffer is configured to issue a pre-write request to acquire exclusive cache coherency state to the first cache line associated with the first store instruction.

23 Claims, 4 Drawing Sheets

METHOD, APPARATUS, AND SYSTEM FOR PREFETCHING EXCLUSIVE CACHE COHERENCE STATE FOR STORE INSTRUCTIONS

BACKGROUND

Field

Aspects of the present disclosure relate generally to store instructions, and more specifically to prefetching exclusive cache coherence state for store instructions.

Background

Computing devices may execute memory access instructions (e.g., load instructions and store instructions) as part of normal processing operations. In the case of computing devices having multiple central processing units (CPUs), the computing device may implement a hardware coherence protocol to ensure that any associated cache memories and system memories shared between the multiple CPUs are updated in response to memory access instructions (and particularly to store instructions) in a coherent manner.

One particular method of ensuring coherence of store instructions in a system where multiple CPUs may share access to a particular memory location is a barrier instruction. A barrier instruction is an instruction which forces all stores preceding the barrier instruction to be visible to all CPUs in the computing device before allowing operations subsequent to the barrier instruction to proceed. This ensures that CPUs working on shared memory values receive the proper updated data so that those CPUs can make forward progress, since a CPU that worked on old data would be effectively wasting the cycles used to do that work. In order to allow the barrier instruction to complete, the CPU working on a particular piece of shared data (i.e., a particular memory location) will acquire exclusive cache coherence state for that data.

However, in modern computing devices having many CPUs (especially in the case of server systems-on-chip (SoCs), which may have tens or more CPUs on a single SoC), the process of acquiring the exclusive cache coherence state for the shared data may involve significant latency, due to system bus contention or other factors. Further, some CPU architectures may gather pending store instructions together and only perform the related memory transaction (i.e., to update the main memory locations associated with those store instructions) on a periodic basis. Thus, if a CPU waits until the store instruction is otherwise complete to retrieve exclusive cache coherence state, the CPU may be forced to stall for a relatively large number of cycles (and, thus, any other CPUs waiting on the data may also be forced to stall). This causes undesirable performance degradation of the system and wastes power because the computing device must remain active but cannot make forward progress.

It would thus be desirable to provide a mechanism for reducing the latency involved with acquiring exclusive cache coherence state related to store instructions.

SUMMARY

The following presents a simplified summary of one or more aspects in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

In one aspect, a method comprises determining if a cache line associated with a store instruction should be allocated in a cache. The method further comprises, if the cache line associate with the store instruction should be allocated in the cache, performing a pre-write to the cache by acquiring exclusive cache coherency state to the cache line associated with the store instruction. The pre-write may be selectively enabled or disabled by software.

In another aspect, an apparatus comprises a cache and a gather buffer coupled to the cache. The gather buffer is configured to store a plurality of cache lines, where each cache line of the plurality of cache lines is associated with a store instruction. The gather buffer is further configured to determine whether a first cache line associated with a first store instruction should be allocated in the cache. The gather buffer is further configured to, if the first cache line associated with the first store instruction is to be allocated in the cache, issue a pre-write request to acquire exclusive cache coherency state to the first cache line associated with the first store instruction.

In yet another aspect, a non-transitory computer readable medium comprises instructions which, when executed by a processor, cause the processor to determine if a cache line associated with a store instruction should be allocated in a cache. The instructions further cause the processor to perform a pre-write to the cache by acquiring exclusive cache coherency state to the cache line associated with the store instruction if the cache line associated with the store instruction should be allocated in the cache.

In yet another aspect, an apparatus comprises means for storing and means for storing memory access instructions coupled to the means for storing. The means for storing memory access instructions is configured to store a plurality of lines, each line associated with a store instruction. The means for storing memory access instructions is further configured to issue a pre-write request to the means for storing to acquire exclusive coherency state to a first line associated with a first store instruction, if the first line associated with the first store instruction should be allocated in the means for storing.

One advantage of one or more disclosed aspects is that the disclosed aspects permit for reduced latency involved with acquiring exclusive cache coherence state for store instructions. In some aspects, this may improve system performance and reduce wasted power associated with the computing device stalling while waiting on store instructions to complete.

DETAILED DESCRIPTION

Aspects of the inventive teachings herein are disclosed in the following description and related drawings directed to specific aspects. Alternate aspects may be devised without departing from the scope of the inventive concepts herein. Additionally, well-known elements of the environment may not be described in detail or may be omitted so as not to obscure the relevant details of the inventive teachings herein.

The word "exemplary" is used herein to mean "serving as an example, instance, or illustration." Any aspect described herein as "exemplary" is not necessarily to be construed as preferred or advantageous over other aspects. Likewise, the term "aspects of the invention" does not require that all aspects of the invention include the discussed feature, advantage or mode of operation.

The terminology used herein is for the purpose of describing particular aspects only and is not intended to be limiting of aspects of the invention. As used herein, the singular forms "a," "an," and "the" are intended to include the plural forms as well, unless the context clearly indicates otherwise. It will be further understood that the terms "comprises", "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequences of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Figure 1:
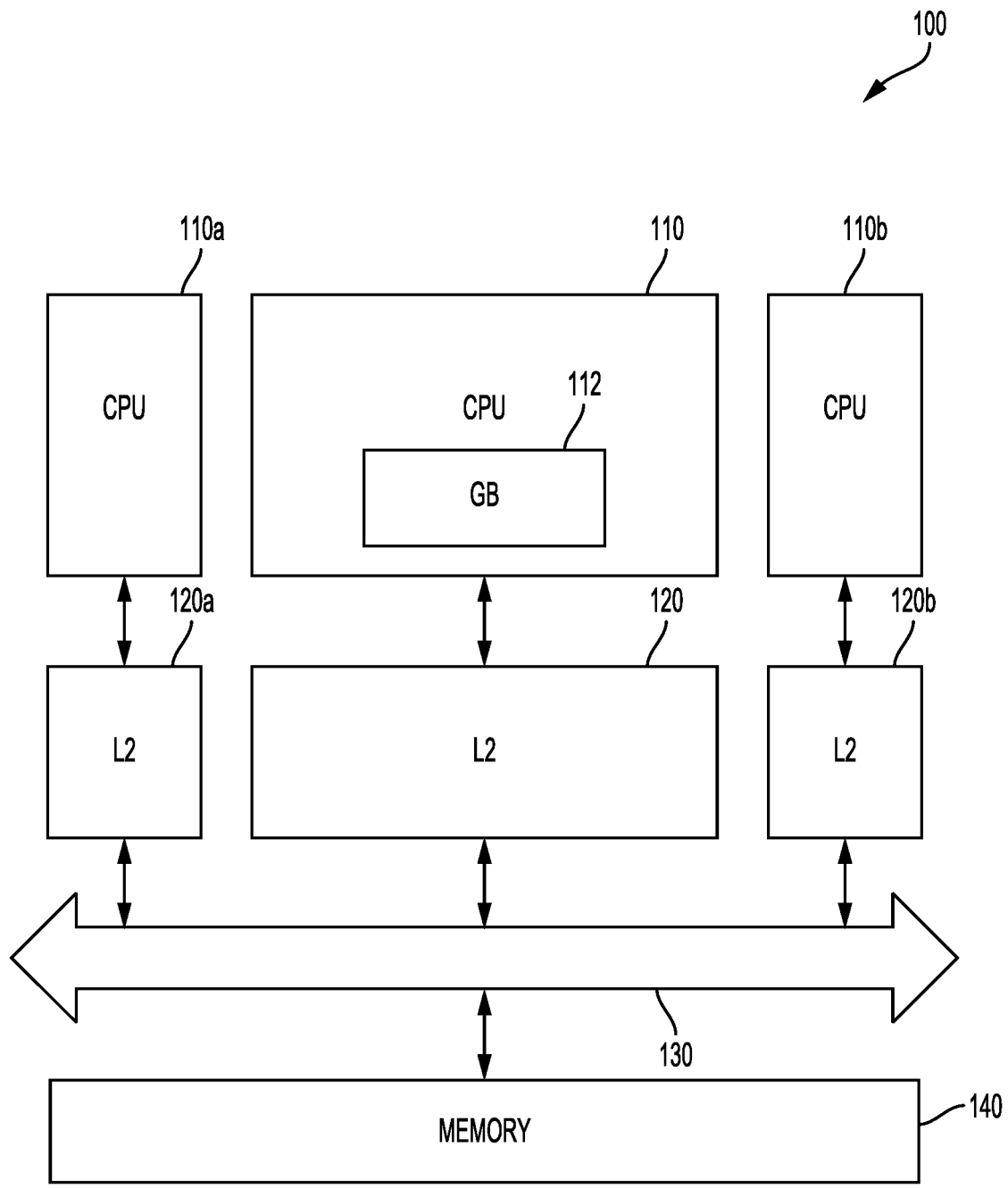
FIG. 1 shows a block diagram of a computing device configured to prefetch exclusive cache coherence state for store instructions according to certain aspects of the present disclosure.

FIG. 1 shows a block diagram of a computing device 100 configured to prefetch exclusive cache coherence state for store instructions according to certain aspects of the present disclosure. The computing device includes CPUs 110, 110a, and 110b. In further detail, CPU 110 includes a gather buffer 112. The gather buffer 112 is a logic block configured to collect memory access instructions (including store instructions) that are pending in the CPU 110, and control when those store instructions are presenting to the associated cache and memory system, which in the illustrated aspect may include a level 2 cache 120 coupled to a main memory 140 through a system bus 130.

CPUs 110a and 110b may also include their own gather buffers (not illustrated) which may be configured to operate in a similar manner to gather buffer 112. CPUs 110a and 110b may further each have an associated level 2 cache 120a and 120b, which are coupled to the main memory 140 through the system bus 130. In one aspect, each level 2 cache 120a and 120b may have an architecture substantially similar to level 2 cache 120 and may be configured to operate in a similar manner to the level 2 cache 120. In another aspect, level 2 caches 120a and 120b may have heterogeneous architectures with respect to level 2 cache 120. Those having skill in the art will recognize that many configurations of CPUs 110, 110a, and 110b, and level 2 caches 120, 120a, and 120b, are possible, and the teachings of the present disclosure may apply to any system, whether heterogeneous or homogeneous, where some subset of CPUs and processors share access to some portion of the memory hierarchy (in one aspect, main memory 140).

In operation, when a store instruction is executed in CPU 110, an entry associated with the store instruction is allocated in the gather buffer 112. When the entry is allocated in the gather buffer 112, information related to the store instruction is communicated to the associated level 2 cache 120. If the store instruction is to be allocated in the level 2 cache 120 (i.e., the store in not transitory or temporary data that will not be used by any other CPU of the computing device 100), the allocation in the gather buffer 112 is accompanied by a pre-write request generated by the gather buffer 112 and presented to the level 2 cache 120. The purpose of the pre-write request is to acquire the exclusive coherency state for the line associated with the store instruction for the level 2 cache 120, but not the cache line associated with the store instruction. This has the added advantage of allowing the gather buffer 112 to be aware of other demands for the data contained in that cache line (as a result of holding that cache line in exclusive coherency state). For architectures that mandate that writes must reach memory in a finite amount of time, this may allow the computing device 100 to indefinitely defer writes while still nominally satisfying the architectural requirement.

In one aspect, this may reduce the memory or bus bandwidth associated with executing the store instruction. Since the pre-write does not fetch any data, the amount of information transferred over a memory bus or system bus is reduced as compared to an operation that fetches both exclusive cache coherency state and associated data. Further, since the level 2 cache 120 will already have exclusive access to the cache line associated with the store instruction when the store instruction is ready to complete, other CPUs (e.g., CPU 110a or 110b) that may be waiting on data generated by the store instruction will not be delayed by the latency involved in the level 2 cache 120 first acquiring exclusive cache coherency state to the cache line associated with the store instruction before performing the store instruction and any associated memory synchronization operations (e.g., a barrier instruction).

Figure 2:
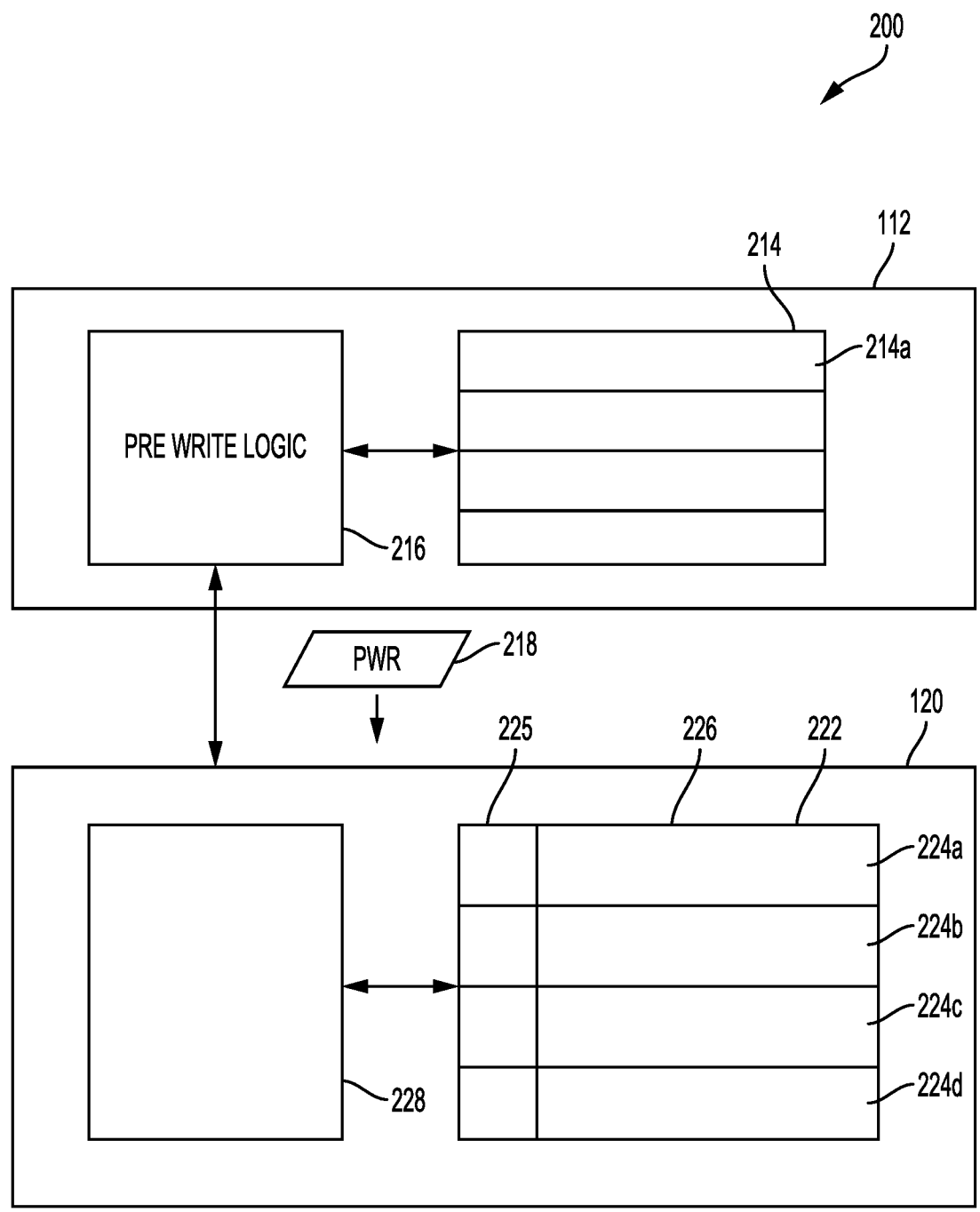
FIG. 2 shows a detailed block diagram of a gather buffer and level two cache according to certain aspects of the present disclosure.

FIG. 2 shows a detailed block diagram 200 of the gather buffer 112 and level 2 cache 120 according to certain aspects of the present disclosure. The gather buffer 112 may include pre-write logic 216 and a data array 214. The data array 214 is configured to store cache lines associated with store instructions (i.e., the cache line that includes the store instruction) executed by the CPU 110. The data array 214 is coupled to the pre-write logic 216, which is configured to determine when a new cache line has been allocated in the data array 214 as a result of a store instruction executed by the CPU 110, and to generate a pre-write request 218 which is communicated to the level 2 cache 120.

The level 2 cache 120 may include a memory array 222 comprising multiple individual cache lines 224a-d. Each cache line 224 may further comprise a cache line coherency state indicator 225 and a tag/data portion 226. The level 2 cache 120 further includes a management block 228 configured to service pre-write requests and manage the cache lines 224a-d.

In operation, gather buffer 112 may allocate line 214a in the data array in response to a store instruction executed by the CPU 110. The gather buffer 112 may also generate the pre-write request 218 associated with the store instruction. The management block 228 receives the pre-write request 218 from the gather buffer 112, allocates a cache line (e.g., cache line 224a, corresponding to line 214a in the gather buffer 112) associated with the store instruction executed by the CPU 110, and sends a request to the memory hierarchy (not illustrated) to acquire exclusive cache coherency state for cache line 224a. If and when the management block 228 receives the exclusive cache coherency state for cache line 224a, management block 228 updates the cache line coherency state indicator 225 associated with cache line 224a to indicate exclusive cache coherency state. However, the tag/data portion 226 of cache line 224a is not updated in response to the pre-write request. Because cache line 224a of the level 2 cache 120 now has exclusive cache coherency state, when the associated store instruction is ready to complete, cache line 224a may be updated immediately because the relevant permission has already been acquired.

Figure 3:
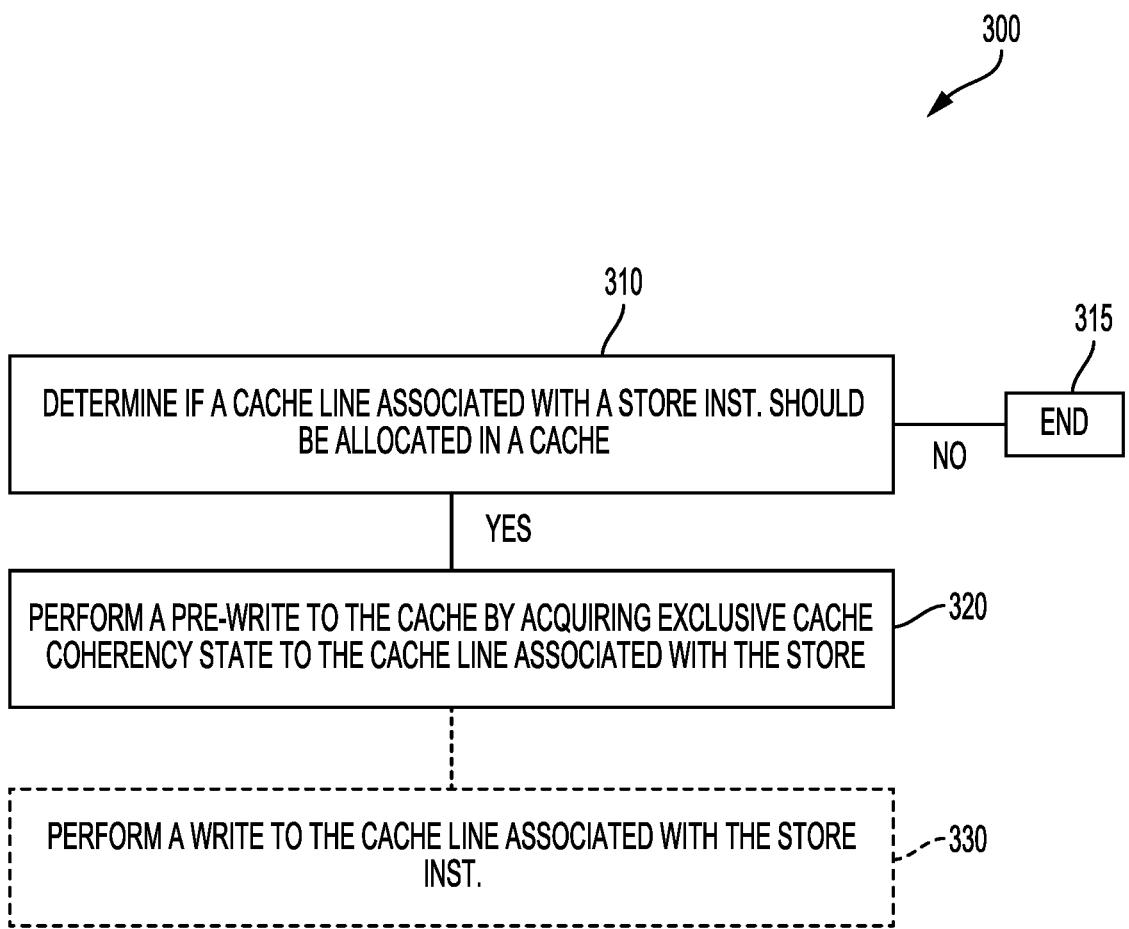
FIG. 3 shows a block diagram of a method of prefetching exclusive cache coherence state for store instructions according to certain aspects of the present disclosure.

FIG. 3 shows a block diagram of a method 300 of prefetching exclusive cache coherence state for store instructions according to certain aspects of the present disclosure. The method begins in block 310 by determining if a cache line associated with a store instruction should be allocated in a cache. For example, with reference to FIG. 1 and FIG. 2, the gather buffer 112 may determine whether or not a store instruction executed by the CPU 110 is transient, or if it should be allocated in the level 2 cache 120.

If the store instruction should not be allocated in the cache, the method 300 ends at block 315. However, if the store instruction should be allocated in the cache, the method proceeds to block 320, by performing a pre-write to the cache by acquiring exclusive cache coherency state to the cache line associated with the store instruction. For example, with reference to FIG. 2, the level 2 cache 120 receives the pre-write request 218 from the gather buffer 112, allocates the cache line 224a associated with the store instruction, and acquires exclusive cache coherency state for the cache line 224a from the memory hierarchy. In some aspects, block 320 may include setting the cache line coherency state indicator 225 associated with the cache line 224a to indicate exclusive cache coherency state.

In one aspect, the pre-write to the cache may be triggered by the first store instruction to a particular cache line that is not already present in the gather buffer. For example, a store instruction for which the associated cache line is already present in the gather buffer may not trigger a pre-write, because the assumption is that the gather buffer would have already triggered a pre-write request in response to the store instruction that initially resulted in the allocation of that cache line in the gather buffer. Further, performing the pre-write may be enabled or disabled by software, as there may be known cases or code sequences where performing the pre-write may hurt performance (e.g., cases where the interface between the CPU 110 and the level 2 cache 120 is near capacity with write operations, especially where those operations write back to memory fairly aggressively—in these cases, the pre-writes generate the additional traffic of pre-fetching the permissions, which may overwhelm the CPU/level 2 cache interface and cause performance losses).

In block 330, the method continues by performing the write to the cache line associated with the store instruction. For example, the gather buffer 112 provides line 214a, which has been updated with the results of the store instruction, to the level 2 cache 120, which updates the associated cache line 224a based on line 214a.

Performing the write to the cache lines associated with the store instruction may be triggered in a variety of different ways, all of which are within the scope of the teachings of the present disclosure. In one aspect, the write to the cache line may be triggered in response to a snoop request to that cache line from another CPU (i.e., a request from another CPU for exclusive access to the cache line). In yet another aspect, the write to the cache line may be triggered by an architectural request or instruction, such as a barrier instruction.

Figure 4:
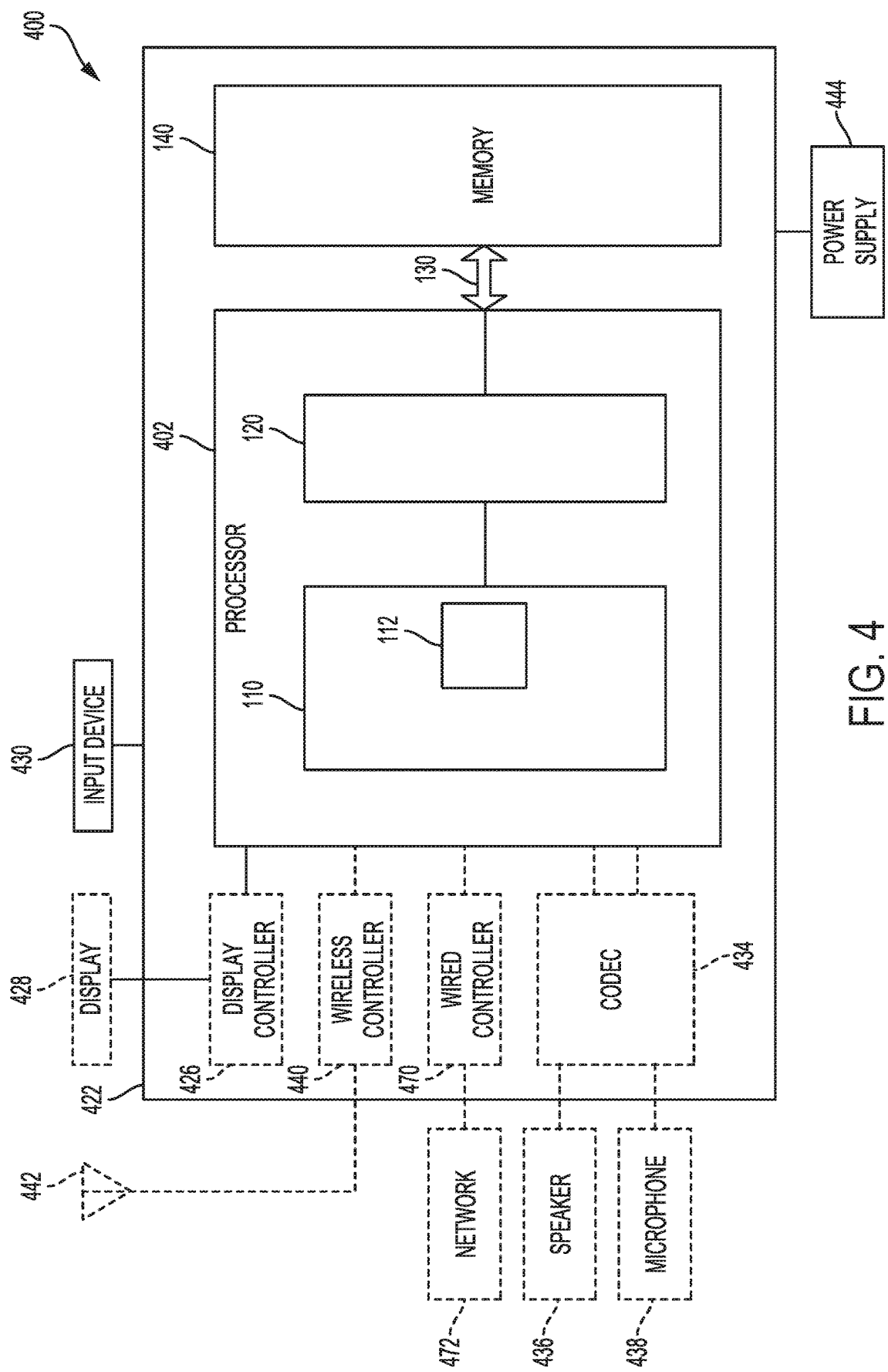
FIG. 4 shows a system-level diagram of a computing device configured to prefetch exclusive cache coherence state for store instructions according to certain aspects of the present disclosure.

An example apparatus in which aspects of this disclosure may be utilized will now be discussed in relation to FIG. 4. FIG. 4 shows a diagram of a computing device 400 incorporating a structure for prefetching exclusive cache coherency state for store instructions as described with respect to FIG. 1 and FIG. 2, and which may be operable in accordance with the method described in FIG. 3. In that regard, the system 400 includes the processor 402 which may incorporate the CPU 110 and the gather buffer 112, the level 2 cache 120, system bus 130, and as described with regard to FIGS. 1 and 2. The system 400 further includes the main memory 140 coupled to the processor 402 via the system bus 130. The memory 140 may further store non-transitory computer-readable instructions that, when executed by the processor 402, may perform the method 300 of FIG. 3.

FIG. 4 also shows optional blocks in dashed lines, such as coder/decoder (CODEC) 434 (e.g., an audio and/or voice CODEC) coupled to processor 402 and speaker 436 and microphone 438 can be coupled to CODEC 434; and wireless antenna 442 coupled to wireless controller 440 which is coupled to processor 402. Further, the system 402 also shows display controller 426 that is coupled to processor 402 and to display 428, and wired network controller 470 coupled to processor 402 and to a network 472. Where one or more of these optional blocks are present, in a particular aspect, processor 402, display controller 426, memory 432, and wireless controller 440 may be included in a system-in-package or system-on-chip device 422.

Accordingly, a particular aspect, input device 430 and power supply 444 are coupled to the system-on-chip device 422. Moreover, in a particular aspect, as illustrated in FIG. 4, where one or more optional blocks are present, display 428, input device 430, speaker 436, microphone 438, wireless antenna 442, and power supply 444 are external to the system-on-chip device 422. However, each of display 428, input device 430, speaker 436, microphone 438, wireless antenna 442, and power supply 444 can be coupled to a component of the system-on-chip device 422, such as an interface or a controller.

It should be noted that although FIG. 4 generally depicts a computing device, processor 402 and memory 404, may also be integrated into a mobile phone, a communications device, a computer, a server, a laptop, a tablet, a personal digital assistant, a music player, a video player, an entertainment unit, and a set top box, or other similar devices.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

While the foregoing disclosure shows illustrative aspects of the invention, it should be noted that various changes and modifications could be made herein without departing from the scope of the invention as defined by the appended claims. The functions, steps and/or actions of the method claims in accordance with the aspects of the invention described herein need not be performed in any particular order. Furthermore, although elements of the invention may be described or claimed in the singular, the plural is contemplated unless limitation to the singular is explicitly stated.

What is claimed is:

1. A method, comprising:
    executing a store instruction;
    in response to the execution of the store instruction, determining whether or not the store instruction should have a cache line associated with the store instruction allocated in a cache;
    issuing, if it is determined that the cache line associated with the store instruction should be allocated in the cache, a pre-write request to the cache; and
    in response to the pre-write request:
    allocating in the cache the cache line associated with the store instruction; and
    acquiring an exclusive cache coherency state for the cache line associated with the store instruction without updating a tag/data portion of the cache line.

2. The method of claim 1, further comprising determining that the cache line associated with the store instruction should not be allocated in the cache when the store instruction is determined to be transient.

3. The method of claim 1, wherein issuing the pre-write request is selectively triggered by determining that the store instruction is a non-transient store instruction associated with a first cache line, wherein the first cache line is not present in a gather buffer.

4. The method of claim 1, further comprising selectively disabling, by a software module, the issuing of the pre-write request.

5. The method of claim 1, wherein acquiring the exclusive cache coherency state for the cache line associated with the store instruction comprises retrieving exclusive cache coherency state for the cache line from a memory hierarchy and setting an indicator associated with the cache line indicating that the cache line has the exclusive cache coherency state.

6. The method of claim 1, further comprising updating the tag/data portion of the cache line associated with the store instruction to complete the execution of the store instruction.

7. The method of claim 6, wherein updating the tag/data portion of the cache line comprises writing data associated with the store instruction from a gather buffer in a processing unit to the cache line in the cache.

8. The method of claim 6, wherein updating the tag/data portion of the cache line is triggered in response to a snoop request to the cache line.

9. The method of claim 6, wherein updating the tag/data portion of the cache line is triggered in response to an architectural request or instruction.

10. The method of claim 9, wherein the instruction is a barrier instruction.

11. An apparatus comprising:
    a cache; and
    a gather buffer coupled to the cache and configured to store a plurality of cache lines, each cache line of the plurality of caches lines associated with a corresponding store instruction wherein:
    the apparatus is configured to execute a first store instruction;
    the gather buffer is further configured to:
    determine, in response to the execution of the first store instruction, whether or not the first store instruction should have a first cache line associated with the first store instruction allocated in the cache; and
    issue, if it is determined that the first cache line associated with the first store instruction is to be allocated in the cache, a pre-write request to the cache; and
    the cache is configured to:
    allocate the first cache line; and
    acquire an exclusive cache coherency state for the first cache line associated with the first store instruction without updating a tag/data portion of the first cache line.

12. The apparatus of claim 11, wherein the gather buffer is configured to not issue the pre-write request when the first store instruction is determined to be transient.

13. The apparatus of claim 11, wherein the gather buffer is configured to issue the pre-write request when the first store instruction is determined to be non-transient and a first cache line associated with the first store instruction is not present in the gather buffer.

14. The apparatus of claim 11, wherein a software module is configured to selectively disable the issuing of pre-write requests by the gather buffer.

15. The apparatus of claim 11 further comprising:
    a memory hierarchy including a main memory coupled to the cache;
    wherein the cache further comprises a plurality of cache lines, each cache line having a coherency state indicator and a tag/data portion; and wherein acquiring the exclusive cache coherency state to the first cache line associated with the first store instruction comprises retrieving the exclusive cache coherency state from the memory hierarchy and setting the coherency state indicator associated with the first cache line associated with the first store instruction to indicate that the cache line has the exclusive cache coherency state.

16. The apparatus of claim 11, wherein the gather buffer is configured to receive data to be written as a result of execution of the first store instruction and write the data into a cache line in the gather buffer associated with the first store instruction.

17. The apparatus of claim 16, wherein the cache is configured to receive data to be written as a result of execution of the first store instruction from the gather buffer and write the data into a tag/data portion of the first cache line of the cache associated with the store instruction.

18. The apparatus of claim 17, wherein writing the data to the first cache line of the cache is triggered in response to a snoop request for the first cache line.

19. The apparatus of claim 17, wherein writing the data to the first cache line of the cache is triggered in response to an architectural request or instruction.

20. The apparatus of claim 19, wherein the instruction is a barrier instruction.

21. The apparatus of claim 11, integrated into a device selected from the group consisting of a mobile phone, a communications device, a computer, a server, a laptop, a tablet, a personal digital assistant, a music player, a video player, an entertainment unit, and a set top box.

22. A non-transitory computer readable medium comprising instructions which, when executed by a processor, cause the processor to:
execute a store instruction;
in response to the execution of the store instruction, determine whether or not the store instruction should have a cache line associated with the store instruction allocated in a cache; and
issue, if it is determined that the cache line associated with the store instruction should be allocated in the cache, a pre-write request to the cache; and
in response to the pre-write receipt:
allocating in the cache the cache line associated with the store instruction; and
acquiring an exclusive cache coherency state for the cache line associated with the store instruction without updating a tag/data portion of the cache line.

23. An apparatus comprising:
means for storing; and
means for storing memory access instructions coupled to the means for storing and configured to store a plurality of lines, each line associated with a corresponding store instruction wherein:
the apparatus is configured to execute a first store instruction;
the means for storing memory access instructions is further configured to:
determine, in response to the execution of the first store instruction, whether or not the first store instruction should have a first line associated with the first store instruction allocated in the means for storing; and
issue a pre-write request to the means for storing, if it is determined that the first line associated with the first store instruction should be allocated in the means for storing; and
the means for storing is configured to:
allocate the first line; and
acquire an exclusive coherency state for the first line associated with the first store instruction without updating a tag/data portion of the first line.

\* \* \* \* \*